Patented Feb. 26, 1935

1,992,190

UNITED STATES PATENT OFFICE 1,992,190

METHOD OF LAMINATING

William Hale Charch, Buffalo, and James E. Snyder, Kenmore, N. Y., assignors to Du Pont Cellophane Company, Inc., New York, N. Y., a corporation of Delaware No Drawing. Application November 21, 1929, Serial No. 408,929. Renewed August 8, 1934

15 Claims. (Cl. 154—40)

This invention relates to adhesives and more particularly to adhesives to be employed with materials formed of or containing cellulose derivatives.

Recently, there has appeared on the market a material which comprises a base of a sheet or film of regenerated cellulose combined with a moistureproofing composition, said composition being preferably in the form of a very thin surface coating or film of approximately one to two ten-thousandths of an inch thick. This material is transparent, flexible, non-tacky, odorless, and successfully resists the penetration of moisture or water vapor therethrough to a substantial degree for a substantial period of time. By virtue of these characteristics, this material has found extensive use as a wrapping tissue, especially for wrapping articles which are apt to deteriorate by gain or loss of moisture. In wrapping such articles, it is desirable that the material completely envelope said articles and be sealed.

The surface coating comprises a cellulose derivative, a gum or resin, a wax and a plasticizer. None of the known adhesives functions (i. e., sticks) satisfactorily with this material. In many instances, the known adhesives destroy or impair one or more of the above-mentioned desirable characteristics.

We have found that we can overcome the above-mentioned defects by providing an adhesive composition which does not deleteriously affect the material and which wets, solubilizes, wholly or partially, or otherwise modifies the surface coating whereby the latter is rendered tacky and in which state the material may be caused to adhere to the desired materials, said adhesive composition containing a gum or resin admixed with a softener with or without a solvent, as desired.

It is, therefore, an object of this invention to provide an adhesive for rendering articles, formed of or containing a cellulose derivative, tacky, so that they may be caused to adhere to desired materials without in any way affecting the desirable characteristics and properties of the materials.

Another object of this invention is to provide an adhesive composition containing a gum or resin and a softener, whereby moistureproof materials, including moistureproof sheets or films of regenerated cellulose, may be joined to like or dissimilar materials.

An additional object of this invention is to provide an adhesive composition containing a gum or resin, a softener, and a solvent, whereby moistureproof materials, including moistureproof sheets or films of regenerated cellulose, may be joined to like or dissimilar materials.

Other objects will appear from the following description and appended claims.

Adhesives for materials formed of or containing cellulose derivatives, such as cellulose nitrate, cellulose acetate, cellulose ether and the like, must possess certain desirable characteristics. Usually, some of the characteristics depend on the manner of application.

In the wrapping of articles by hand, it is desirable to have an adhesive which will set quickly so as to avoid the necessity for holding the joint too long. In wrapping machines, this characteristic is not so essential inasmuch as mechanical mechanisms may be provided to hold the joint until the adhesion is complete and/or heat may be applied to hasten the sealing or joining operation. In hand application the tendency of an adhesive to string is not a serious matter. On the other hand, it becomes an important consideration in machine application and should be avoided. In general the adhesive should not deleteriously affect the material or impair its desirable properties in any way. It should produce a substantially permanent joint, which joint is transparent, colorless, flexible, non-tacky and odorless.

It is also desirable that the adhesive composition be relatively stable so that it will not undergo any change in composition upon exposure to atmospheric conditions, and particularly those conditions which are present during storage and the application of the adhesive. Another desirable characteristic of the adhesive is the non-corrosive effect on metals and other materials with which it may contact.

To attain the above-mentioned characteristics and properties, we have found that compositions of gummy substances, such as water-insoluble gums or resins, compounded with softeners, with or without solvents, produce satisfactory results. The adhesives produced from gummy substances and softeners without solvents may be rendered fluid by heat and they may be applied in this state, the seal being effected on cooling. Gums or resins (natural or synthetic) capable of becoming tacky, when softened and/or rendered fluid by heating in the presence of a substantially non-volatile liquid, such as a non-drying oil, may be used. The hot adhesive sets substantially immediately upon cooling and gives a substantially permanent tacky surface whereby the desired seal or joint is obtained. After the adhesive is in a set condition, it not only is flexible but also is subject to cold flow.

The example hereafter given illustrates one specific embodiment of the adhesive above described. It is, of course, to be understood that the invention is not restricted to this specific embodiment, since it is apparent that various other gummy substances, oils and/or softeners in various proportions may be used.

The example referred to above is as follows:

|  | Parts |
|---|---|
| 1. Manila gum | 5 |
| Castor oil | 8 |

In many instances, it is desirable to have an adhesive which is capable of application without the aid of heat. This is usually attained by forming the adhesive in the form of a solution or suspension in some suitable solvent.

The following examples set forth various modifications of such adhesives. It is, of course, to be understood that the specific ingredients and proportions thereof are not limitative of the invention since it is apparent that various changes thereof may be made without departing from the spirit of the invention:

|  | Part |
|---|---|
| 2. Gum anime | 1 |
| Castor oil | 0.6–1.0 |
| Acetone (approximately) | 1 |
| 3. Gum kauri | 1 |
| Castor oil | 0.8–1 |
| Acetone (approximately) | 1 |
| 4. Gum tarnati | 1 |
| Castor oil | 0.6–1 |
| Acetone (approximately) | 1 |
| 5. Gum manila | 1 |
| Castor oil | 0.7–1 |
| Acetone (approximately) | 1 |
| 6. Gum pontianak | 1 |
| Castor oil | 0.6–1 |
| Acetone (approximately) | 1 |
| 7. Gum pontianak | 1 |
| Castor oil | 0.6–1.6 |
| Ethyl alcohol (approximately) | 1 |
| 8. Gum pontianak | 1 |
| Tri-cresyl phosphate | 1–1.3 |
| Ethyl alcohol (approximately) | 1 |

From the foregoing, it is apparent that the softener is present in a quantity at least equal to 50% by weight of the gummy substance.

In the above examples, only one resin was set forth in each of the modifications. It is, of course, to be understood that a plurality of resins and/or gums may be used instead of a single resin. Instead of the specific softeners above set forth, various other softeners may be used, such as, for instance, any non-volatile or substantially non-volatile liquids capable of mixing with the resin and solvent. The nature of the resin and softener determines, to some extent, the nature of the solvent. For some purposes, mixtures of resins and/or gums with mixtures of softeners may be employed. In other combinations of resins and softeners, a mixture of solvents or solvent mixtures may be used. When solvent mixtures are used, it is desirable that the greater portion thereof boil below 100° C.

The compositions may be prepared by dissolving the resins and/or gums alone or in combination with the softeners in the solvent. If desired, the resins and/or gums may be dissolved in the solvent and the softeners subsequently added; or, the resins and/or gums and the softeners may be separately dissolved in portions of the solvents and the two solutions subsequently mixed. In cases where the resins and/or gums contain foreign matters, the resins and/or gums may be extracted by the solvent and the extract used in the preparation of the adhesive.

To secure, seal or join a material of the type herein described, such as, for example, moistureproof sheets or films of regenerated cellulose to itself or other material, it is only necessary to apply the adhesive to at least one of the surfaces which are to be brought in contiguous and superimposed relationship. Subsequently, the materials are brought in proper position and united, preferably with the aid of pressure. When a thermoplastic adhesive of the type described in Example 1 is employed, the union of the materials may be effected prior to or subsequent to the cooling of the adhesive. When the union of the materials is effected subsequent to the cooling of the adhesive, this is accomplished by the aid of heat sufficient to render the thermoplastic adhesive tacky. When adhesives of the type described in Examples 2 to 8 inclusive are employed, the materials are brought into position after the application of the adhesive, as above mentioned, and prior to the evaporation of the solvent. If desired, heat may be used in connection with the pressure to expedite the evaporation of the solvent.

The above invention is described with particular reference to the sealing of wrappers formed of moistureproof regenerated cellulose sheeting. It is apparent that the adhesive may be used with any material formed of or containing cellulose derivatives. For instance, it may be used in the production of laminated articles in which any material, such as paper, metal sheets or foils, cardboard or fabrics, are secured to moistureproof sheets or films of regenerated cellulose or other materials containing or formed of cellulose derivatives. As above explained, the adhesives, and particularly those of the thermoplastic type and described in Example 1, are subject to cold flow. When such adhesives secure together sheets having different shrinkage characteristics to form a laminated material and one of said sheets tends to swell or shrink, slippage of one sheet with respect to the other is provided, with the consequence that buckling, wrinkling and/or curling in the product is appreciably reduced. Optimum results are secured when the laminae consist of materials which do not become appreciably impregnated with the composition. It is also applicable as a medium for affixing labels to materials of the type herein referred to.

Since it is apparent that various changes may be made in the above specific details, the invention is not restricted thereto except as defined in the appended claims.

We claim:

1. A method of sealing or joining moistureproof materials, including sheets or films of regenerated cellulose coated with a composition comprising a wax, to like or dissimilar material which comprises applying to at least one of the materials to be united an adhesive comprising as essential ingredients gum manila and castor oil which forms, when set, a flexible, odorless and transparent film, the castor oil being present in an amount at least equal to 50% by weight of the gum manila, and uniting the materials.

2. A method of sealing or joining moistureproof materials, including sheets or films of regenerated cellulose coated with a composition comprising a wax, to like or dissimilar material which comprises applying to at least one of the materials to be united an adhesive comprising as essential ingredients gum manila, castor oil and acetone which forms, when set, a flexible, odorless and transparent film, the castor oil being present in an amount at least equal to 50% by weight of the gum manila, and uniting the materials.

3. A method of sealing or joining moistureproof materials, including sheets or films of regenerated cellulose coated with a composition comprising a wax, to like or dissimilar materials which comprises applying to at least one of the materials to be united an adhesive comprising as essential ingredients 1 part manila gum, 0.7 to 1.0 parts of castor oil and 1 part of acetone, the proportions being by weight, which forms, when set, a flexible, odorless and transparent film, and uniting the materials.

4. A method of sealing or joining moistureproof materials, including sheets or films of regenerated cellulose coated with a composition comprising a wax, to like or dissimilar material which comprises applying to at least one of the materials to be united a molten thermoplastic adhesive comprising as essential ingredients a gummy substance and a softener which forms, when set, a flexible, odorless and transparent film, and uniting the materials.

5. A method of sealing or joining moistureproof materials, including sheets or films of regenerated cellulose coated with a composition comprising a wax, to like or dissimilar material which comprises applying to at least one of the materials to be united a molten thermoplastic adhesive comprising as essential ingredients a gummy substance and a softener which forms, when set, a flexible, odorless and transparent film, the softener being present in an amount at least equal to 50% by weight of the gummy substance, and uniting the materials.

6. A method of sealing or joining moistureproof materials, including sheets or films of regenerated cellulose coated with a composition comprising a wax, to like or dissimilar material which comprises applying to at least one of the materials to be united a molten thermoplastic adhesive comprising as essential ingredients gum manila and castor oil which forms, when set, a flexible, odorless and transparent film, and uniting the materials.

7. A method of sealing or joining moistureproof materials, including sheets or films of regenerated cellulose coated with a composition comprising a wax, to like or dissimilar material which comprises applying to at least one of the materials to be united a molten thermoplastic adhesive comprising as essential ingredients gum manila and castor oil which forms, when set, a flexible, odorless and transparent film, the castor oil being present in an amount at least equal to 50% by weight of the gum manila, and uniting the materials.

8. A laminated material comprising a plurality of plies secured together by a thermoplastic adhesive subject to cold flow and containing a resin as an essential ingredient thereof, one of said plies being of the class which consists of moistureproof regenerated cellulose sheeting and sheeting having a surface containing a cellulose derivative.

9. A laminated material comprising a plurality of plies secured together by a thermoplastic adhesive subject to cold flow and containing a resin and a plasticizer as essential ingredients thereof, one of said plies being of the class which consists of moistureproof regenerated cellulose sheeting and sheeting having a surface containing a cellulose derivative.

10. A laminated material comprising a plurality of plies secured together by a thermoplastic adhesive subject to cold flow and containing manila gum as an essential ingredient thereof, one of said plies being of the class which consists of moistureproof regenerated cellulose sheeting and sheeting having a surface containing a cellulose derivative.

11. A laminated material comprising a plurality of plies secured together by a thermoplastic adhesive subject to cold flow and containing manila gum and castor oil as essential ingredients thereof, one of said plies being of the class which consists of moistureproof regenerated cellulose sheeting and sheeting having a surface containing a cellulose derivative.

12. A laminated material having at least one ply consisting of moistureproof regenerated cellulose sheeting secured to the adjacent ply by a thermoplastic adhesive subject to cold flow and containing a resin as an essential ingredient thereof.

13. A laminated material having at least one ply consisting of moistureproof regenerated cellulose sheeting secured to the adjacent ply by a thermoplastic adhesive subject to cold flow and containing a resin and a plasticizer as essential ingredients thereof.

14. A laminated material having at least one ply consisting of moistureproof regenerated cellulose sheeting secured to the adjacent ply by a thermoplastic adhesive subject to cold flow and containing manila gum as an essential ingredient thereof.

15. A laminated material having at least one ply consisting of moisture proof regenerated cellulose sheeting secured to the adjacent ply by a thermoplastic adhesive subject to cold flow and containing manila gum and castor oil as essential ingredients thereof.

WILLIAM HALE CHARCH.
JAMES E. SNYDER.